May 28, 1935.   W. L. LEWIS   2,003,206
AIRCRAFT
Filed Dec. 2, 1931   3 Sheets-Sheet 2
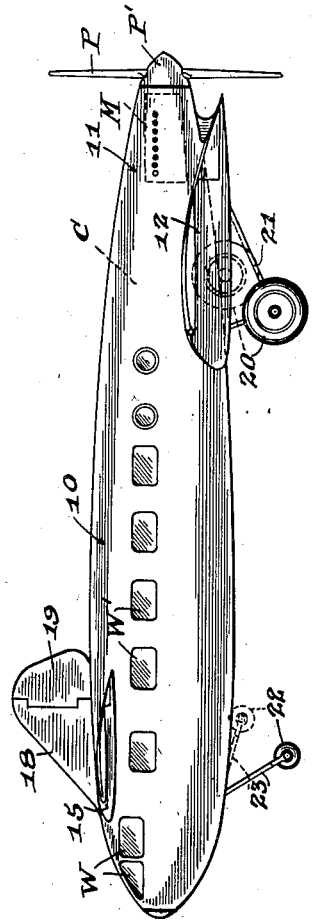
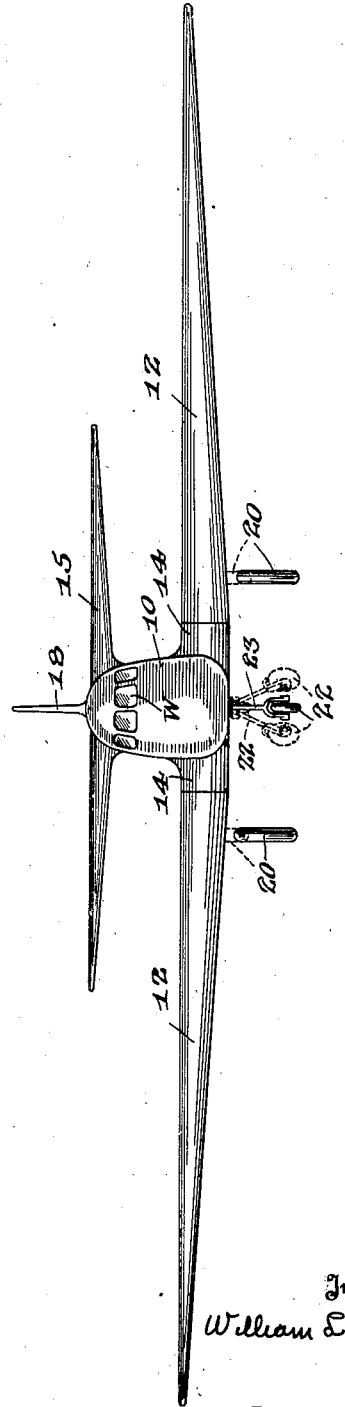
Inventor
William L. Lewis
By
Attorney May 28, 1935. W. L. LEWIS 2,003,206
AIRCRAFT
Filed Dec. 2, 1931 3 Sheets-Sheet 3
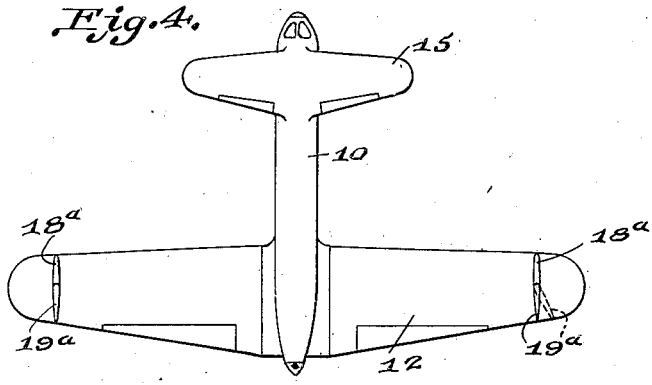
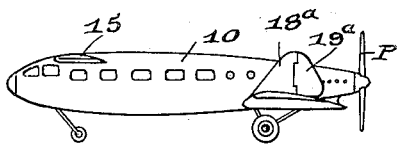
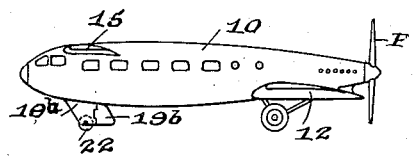
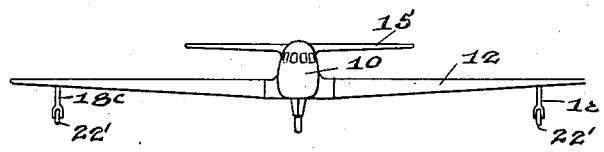
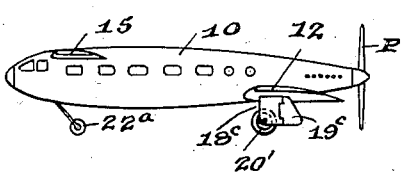
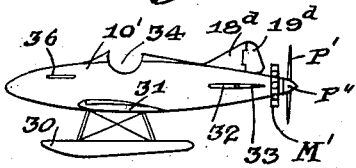
Inventor
William L. Lewis
By
Attorney Patented May 28, 1935

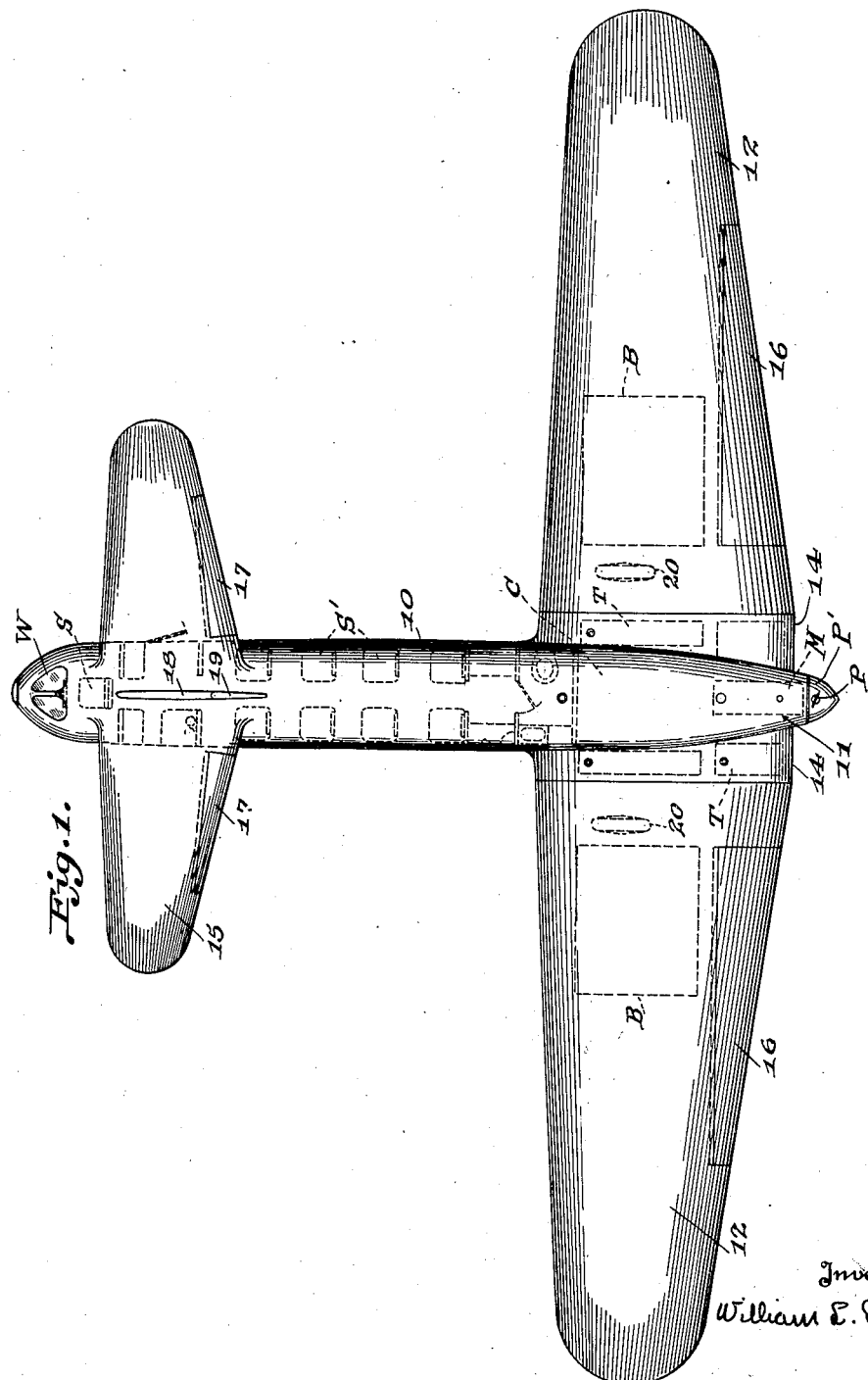

2,003,206

UNITED STATES PATENT OFFICE 2,003,206

AIRCRAFT

William L. Lewis, Los Angeles, Calif.

Application December 2, 1931, Serial No. 578,583

12 Claims. (Cl. 244—14)

This invention relates to certain improvements in aircraft; and the nature and objects of the invention will be readily recognized and understood by those skilled in the aeronautical art in the light of the following explanation and detailed description of the accompanying drawings illustrating what I at present consider to be the preferred embodiments or mechanical and aerodynamic expressions of my invention from among various other forms, embodiments, combinations, and constructions of which the invention is capable within the spirit and the scope thereof.

It is a general aim and object of my present invention to materially increase the aerodynamic, mechanical and structural efficiency and the utility of aircraft of the heavier-than-air types, which types are hereinafter referred to generally by the term "airplane" (the term "airplane" being employed herein in a generic sense to include any and all heavier-than-air craft whether of the land, or water, or combined land and water types); and in carrying out and fulfilling such general object, the invention is fundamentally characterized by a design of the major elements of an airplane and a structurally and aerodynamically cooperating relative arrangement and assembly of such elements, by which drag is materially reduced with head resistance at a minimum, while the efficiency of a power plant and a propeller driven thereby is increased, and the useful load capacity and distribution thereof improved without structural or size complications relative to the power utilized in propelling the aircraft.

A basic feature and characteristic of a design of airplane of the invention resides in the provision of a body for the airplane of substantially pure streamline or low resistance form having a minimum of deformation of such form, particularly at the nose or forward end portion thereof, with a propeller at the tail of such body, and the supporting surfaces or wings and control surfaces mounted on the body forwardly of the propeller, so that the propeller is removed from the aerodynamic effect of such surfaces, and the body and surfaces will not be subjected to the efficiency lowering effect thereon of the propeller slipstream.

The design of the invention is further characterized by the mounting of the power plant for driving the propeller, at the extreme tail end of the streamline body, in order to utilize space therein and thereon of minimum useful or pay load value, and to reduce noise and vibration of the power plant within the useful or pay load space proper within the body forward of the power plant, as well as to minimize and practically eliminate the possibility of poisonous gases and unpleasant odors gaining access to the space within the body forwardly of the power plant location.

Another feature of the invention, which is to a large extent made possible by certain of the characteristics above referred to, is found in the availability of a maximum of the space within the body for useful and pay load purposes, and in the arrangement of such space for an efficient distribution of the load without cramping and with a maximum of accessibility, while permitting a structurally simple and efficient construction being employed for the body.

Another characteristic of the invention is presented by the design, arrangement and mounting of the control surfaces, and particularly the directional surfaces or rudders for an airplane having the basic features of the invention, for the purpose of obtaining high efficiency aerodynamically from such surfaces, while retaining structural simplicity therein and in the relative mounting thereof on and with respect to the other elements making up an airplane embodying the invention.

Another feature of the invention is presented by the control surface and supporting surface or wing locations relative to each other and to the airplane propelling means, by which an increased ease and sensitivity of pilot control is obtained, by a material reduction in torque effect on the airplane arising from slipstream action developed by the propelling means.

A further feature of the basic and fundamental characteristics of a design of my invention, is the general adaptability thereof to embodiment in and application to a wide variety of types of airplanes for various purposes and special uses, and the fact that when so embodied, an increased aerodynamic, mechanical, and structural efficiency is obtained for any of such types.

With the foregoing general features, characteristics and results in view, as well as certain others which will be developed and readily recognized from the following explanation of the invention, the invention consists in certain novel features in design and in combinations and arrangements of elements, all as will be more fully and particularly referred to and pointed out hereinafter.

Referring to the accompanying drawings in which similar reference characters refer to corresponding elements throughout the several figures thereof:

Fig. 1 is a top plan view of a form of transport airplane embodying a design and arrangement of the invention.

Fig. 2 is a view in side elevation of the airplane of Fig. 1.

Fig. 3 is a view of front elevation of the airplane of Figs. 1 and 2.

Fig. 4 is a top plan view, more or less diagrammatic, of an airplane of the type of Fig. 1 showing a modified arrangement of vertical fins and rudders.

Fig. 5 is a fragmentary view in side elevation of one of the vertical fins and its rudder of Fig. 4, mounted on the wing.

Fig. 6 is a view in side elevation, more or less diagrammatical, of an airplane of the type of Fig. 1, showing another mounting for and arrangement of the vertical fin and rudder.

Fig. 7 is a view in front elevation, more or less diagrammatic, of an airplane of the type of Fig. 1, with an arrangement of opposite side, vertical fins and rudders mounted below a wing, in cooperation with a modified arrangement of landing gear wheels.

Fig. 8 is a view in side elevation of the airplane and fin and rudder arrangement of Fig. 7.

Fig. 9 is a more or less diagrammatic view in side elevation of an embodiment of the invention in an open cockpit type of seaplane, with a motor of the air cooled radial type.

One possible aerodynamic and structural expression of the basic characteristics and features of my invention is disclosed in Figs. 1 to 3 of the accompanying drawings, as presenting an airplane of the relatively large transport type, but it is to be clearly understood that the illustrated embodiment was selected purely by way of an example and not by way of limitation, for the purpose of exemplifying the fundamental principles and characteristics involved in the invention and permitting an explanation thereof so that those skilled in the art may be enabled to readily comprehend the same.

In accordance with the fundamental characteristics of my invention, as expressed in the embodiment of Figs. 1 to 3, the airplane includes a body or fuselage 10 of substantially pure streamline, or low head or air resistance form, without material or at least any substantial deformation of such form, from nose to tail thereof, and especially at the nose or forward portion of the fuselage. The rear or tail end of body or fuselage 10 is formed to receive or mount the motor or power-plant from which the airplane is driven or propelled, and in the particular example hereof, such a motor or power plant M, of say the liquid cooled type, is diagrammatically indicated by dotted outline in Figs. 1 and 2, as mounted and enclosed within the extreme rear or tail end portion 11 of the fuselage. In this manner, space within the body or fuselage 10 of least pay load value because of its location and relatively small diameter or cross sectional area, is utilized for the power plant, while space forwardly of the tail end with its greater diameter or cross sectional area is released for pay load purposes.

Preferably, as is the case with the motor M of the instant example, such motor is entirely enclosed within the fuselage 10 without substantial deformation of the portion 11 thereof within which confined, and where the motor is of the internal combustion or such like types, the exhaust lines or manifolds therefor need not be appreciably extended beyond the fuselage contour. This reduces size and weight of manifolds or exhaust lines, and is possible because of the extreme rear location of the motor with the useful and pay load space within fuselage 10 forward thereof, making it unnecessary to carry exhaust products from the motor to points of discharge remote from the motor and spaced outwardly from the body or fuselage. Such mounting and location of the motor at the rear end or tail of fuselage 10 substantially reduces the effect of vibration on the forward portions of the fuselage, while the noise of the motor at locations within the fuselage is also materially reduced. Odors and poisonous gases, discharged by the motor M at the extreme rear end of the fuselage, are carried directly rearwardly away from the fuselage, and any entry into the forward portions of the fuselage is thus practically eliminated, thereby doing away with the disagreeable and sickening effect of odors and gases on occupants of the fuselage.

The extreme rear end or tail mounted motor M, drives a propeller P, which is mounted on the usual or any desired motor driven propeller shaft (not shown), in position at the extreme rear or tail end, and at the exterior, of fuselage 10, for rotation, in the specific example hereof, on an axis in alinement with the fore and aft or longitudinal axis of the fuselage. The propeller P is provided with a streamline hub member or cap P', which forms a rearward continuation of and fairing for the tail end portion 11 of fuselage 10, to carry out the low resistance streamline contour of such fuselage, as clearly shown by Figs. 1 and 2 of the drawings.

The foregoing mounting of the propeller P on and in relation to the streamline body or fuselage 10, constitutes one of the basic characteristics of the invention, and with the slipstream from propeller P directed rearwardly and the body or fuselage 10 completely removed from such slipstream the aerodynamic efficiency lowering effects of a propeller slipstream on the body are eliminated. The drag developed is substantially decreased by the elimination of the skin friction of a slipstream flowing rearwardly over the body or fuselage, and at the same time the efficiency of the propeller P is increased because of the relatively smooth air in which it operates with no body or structure to the rear to blank out the propeller, the relatively small tapering body portion 11 in front thereof not having any material blanking effect on the propeller.

In the specific example of Figs. 1 to 3, the motor M is disclosed as mounted and enclosed within the extreme rear or tail portion 11 of the body or fuselage 10. However, the invention is not so restricted as any other type of motor, or in fact any propelling means, may be utilized and the invention contemplates and includes any type of motor or propelling means. For example, a motor of the radial or rotary air cooled type may be utilized, such as the radial air cooled type of motor M' shown in Fig. 9, in which event such a motor is mounted on the exterior of the fuselage or body at the extreme rear or tail end thereof with and driving propeller P. When such a motor of the air cooled type is employed mounted at the rear end of the fuselage, due to the smooth airflow to which the motor is subjected, greatly increased cooling efficiency is obtained.

The invention further provides for a location and disposition of the entire supporting surface or wing area, as well as the control surfaces for the airplane, forwardly of the propeller P and removed from the effects of the propeller slipstream thereon, and eliminating the effect of such surfaces on the propeller slipstream. A possible arrangement of the supporting and control surfaces to meet such requirement of the invention, on and with respect to body or fuselage 10 and propeller P is disclosed in Figs. 1 to 3, as applied to and expressed in the specific airplane design thereof.

In such example, the major supporting surface or wing area is provided by a wing 12 of, in this instance a low monoplane wing type, although the invention is not so limited, extending from opposite sides of fuselage 10 at the rear end portion thereof. The opposite panels of wing 12, may if desired be attached at their inner or root ends to the opposite ends, respectively, of a center section forming portion 14 built into and extending as stubs from opposite sides of the fuselage, with the trailing edge of the wing disposed throughout its span forwardly of the plane of rotation of propeller P (see Figs. 1 and 2). A forward wing 15 of considerably less area and span, than rear wing 12, is mounted extending from opposite sides of the forward upper portion of fuselage 10, with its leading edge spaced a distance aft or rearwardly from the nose portion of the fuselage. This forward wing 15 is disposed in a plane above rear wing 12 and forms with the latter the total supporting or lift surface for the airplane.

The major or rear wing 12, in the example hereof, mounts and carries the lateral control surfaces or ailerons 16, which are here of the trailing edge flap type mounted and disposed at opposite sides of fuselage 10. The forward wing 15 mounts and carries the opposite side trailing edge type of flaps 17 which form the elevators for the craft, while the wing 15 functions in addition as a horizontal stabilizing surface, in cooperation with wing 12. The foregoing arrangement and mounting of the ailerons 16 and elevators 17 is clearly illustrated in Fig. 1 of the drawings. Any conventional or other suitable pilot operated mechanism (not shown) is of course provided for properly actuating elevators 17 and ailerons 16, in the usual manner, it not being considered necessary in the present application to disclose such a mechanism.

Attention is here directed to the fact that the invention recognizes and includes as the equivalent to the arrangement of elevators 17 on forward wing 15, a mounting of such forward wing for vertical swinging around its front spar as an axis, for either manual or automatic operation to alter its angle of incidence to secure a balanced condition of the airplane and/or for control purposes.

The directional stability and directional control of the airplane of Figs. 1 to 3, is obtained in accordance with another feature of my invention, through the medium of a vertical stabilizer or fin 18 to the trailing edge of which a vertical rudder 19 is pivotally mounted for horizontal swinging on a vertical axis, which stabilizer and rudder are mounted and positioned forward of the propeller P removed from the effect of the propeller slipstream thereon, and in a position reducing or eliminating the effect of the stabilizer and rudder on the propeller and its slipstream. For instance, I have shown in Figs. 1 to 3, a possible mounting and location for the fin and rudder 18—19, as on the upper side of and extending upwardly from the fuselage or body 10 disposed along but above the longitudinal axis of the airplane, at the front wing 15 location but with the rudder 19 extending slightly aft of such front wing. The rudder 19 is of course suitably operatively connected with a usual or any suitable pilot control mechanism, which it is not thought necessary to illustrate herein. With such a mounting and location of the fin and rudder 18—19, spaced well forward of the propeller P, the propeller will not be subjected to operation in the wash and resulting air turbulence created by such surfaces, and the propeller efficiency is thereby increased by such location of the fin and rudder with respect thereto.

The location and mounting of wings 12 and 15, and of the control surfaces 16, 17, 18, and 19, relative to each other, and all forwardly of the propeller P and its slipstream, eliminates all of disadvantageous effects of the propeller slipstream thereon, with a material reduction in drag from skin friction, and of torque due to the spiral or rotating movement of the slipstream on the body, wings, and control surfaces; all of which increases the effectiveness and sensitiveness of the controls with ease of pilot operation thereof, and appreciably increases the efficiency of the airplane. Further, by the location of wings and control surfaces relative to the propeller P in accordance with the principles of the invention, a material increase in propeller efficiency results because the propeller operates in relatively smooth air free from control surface wash and air turbulence.

A landing gear arrangement and mounting for the airplane of Figs. 1 to 3, may, as in the illustrated example, include the pair of spaced and preferably retractible landing wheels 20 mounted by a suitable structure 21 in position at opposite sides of fuselage 10 beneath wing 12, for normal landing position shown in full lines in Figs. 2 and 3, depending below the wing, and for retracted position, shown by dotted lines, drawn upwardly within, or partially within wing 12. The landing gear also includes, a forward wheel 22, preferably of the retractible type, carried by a supporting structure 23, and mounted from and in position at the under side of body or fuselage 10 (see Fig. 2) below the location of forward wing 15. The extended normal landing position of forward wheel 22 is shown by full lines, and its retracted position drawn at least partially up into the fuselage 10 by dotted lines, in Figs. 2 and 3.

The forward landing gear wheel 22 is preferably steerable and under control of the pilot by any suitable mechanism (not shown) for ground handling and control of the airplane, as in taxiing the same under power on the ground, particularly with the directional control surface or rudder 19 removed as it is from the propeller slipstream. The forward wheel 22 is shown in steering positions swung to the left or right, by dotted lines in Fig. 3.

The airplane of the invention as disclosed in Figs. 1 to 3, is primarily adapted for transport purposes, and by the arrangement thereof, an efficient distribution of useful and pay load is possible without structural complications. The forward or nose end of the body or fuselage forms the pilot compartment or space within which is located the pilot's seat S, referring now to Fig. 1 of the drawings, suitable windows or ports W being provided in the nose of the fuselage, or if desired an open pilot's cockpit can be utilized. From such location the pilot is afforded excellent and a wide vision range. The body or fuselage aft of the nose end provides a structurally unencumbered interior or cabin space within which seats S' are provided for passengers, with cabin or body side windows W' for vision. With the wings 12 and 15 mounted removed from the intermediate passenger cabin providing section of the fuselage, uninterrupted vision for passengers is obtained. The after end of body or fuselage 10 forward of the motor mounting section 11 thereof, may be utilized to provide the cargo space or compartment C (see Figs. 1 and 2). Baggage compartments B (see Fig. 1) can be formed in the wing 12 at opposite sides of fuselage 10, while oil and fuel tanks T are conveniently located in proximity to motor M, in the center section 14 of wing 12, at opposite sides of the fuselage. The location of motor, and oil and fuel supplies at the rear or tail end of the body materially reduces the fire hazard, and the extreme rear location of propeller P removes or reduces injury possibilities, and eliminates the disagreeable effect of the propeller slipstream on passengers entering and leaving the fuselage.

The forward wing 15 provides readily accessible storage space for navigational and flight operating equipment, at points convenient to the pilot. With the motor M mounted at the tail of body 10, the sensitive navigational and electrical instruments, as well as radio equipment, installed at the forward or nose end of the body and in the pilot's compartment, are subjected to a minimum of vibration by and electrical interference from the motor M and its electrical and ignition systems.

Within the broad principles of my invention, I have disclosed, diagrammatically in Figs. 4 and 5 of the drawings, a modified arrangement of vertical stabilizing fins and directional control surfaces or rudders, as applied to a design of Figs. 1 to 3. In this modified arrangement, a vertical fin 18a with rudder 19a pivotally mounted thereon, is mounted on and extending upwardly from wing 12 adjacent each wing tip thereof. The opposite rudders 19a are preferably so arranged and coupled with a suitable operating mechanism (not shown) that upon positive swinging of either rudder by such mechanism, the opposite rudder is free to float and will swing in the opposite direction, and a turning moment at and on both sides of the longitudinal axis or center line of the airplane is set up, which results in rotation of the airplane in the desired direction.

In another modification of the vertical fin and rudder mounting and location, applied as an example to the airplane of Figs. 1 to 3, diagrammatically shown in Fig. 6 of the drawings, the vertical fin 18b is mounted depending from the under side of the fuselage 10 at a location beneath the forward wing 15, and carries and mounts at and streamlined within the lower end of the fin, the forward landing wheel 22 of the landing gear. The vertical rudder 19b is pivotally mounted in the usual manner to the trailing edge of fin 18b for operation to directionally control the airplane.

Another possible arrangement of multiple rudders, operable in the manner of rudders 19a of Figs. 4 and 5, is diagrammatically shown by Figs. 7 and 8 of the drawings. In such arrangement, the fins 18c are mounted depending from the wing 12 at opposite sides and adjacent the wing tips, respectively, with landing gear wheels 22' mounted and suitably streamlined at the lower ends thereof. A rudder 19c is pivotally mounted on the trailing edge of each fin 18c and extends rearwardly therefrom for directional control of the airplane in a manner similar to that referred to with respect to the multiple rudders of Figs. 4 and 5. A larger landing wheel 20', which is preferably retractible, is mounted depending from fuselage 10 intermediate wheels 22', and substantially in rearward alinement with the forward wheel 22a. The foregoing arrangement is such that the smaller, wing mounted rear wheels 22' come in contact with the ground only when wing 12 is tipped or while the airplane is resting on the ground, and the landing loads are taken by the larger single, center landing wheel 20'.

If desired, the arrangement of Figs. 7 and 8 may be modified by the elimination of the center, rear wheel 20', and the design and construction of the depending vertical fins carried by opposite wheels 22', as the primary landing wheels, in cooperation with forward landing gear wheel 22a.

As exemplifying the adaptability of the basic principles and fundamental characteristics of the invention to various other types of airplanes, than the relatively large transport type of Figs. 1 to 3, I have more or less diagrammatically illustrated in Fig. 9 of the drawings, a relatively small, open cockpit, monoplane type of seaplane embodying the invention. The seaplane of Fig. 9, includes the streamline or low resistance fuselage 10', having the usual or any desired water landing gear which includes the float or floats 30, and the low type monoplane wing 31. Following the teachings of my invention, the power plant M' embodies an air cooled radial or rotary type of motor which is mounted on the extreme rear or tail end of fuselage 10' and drives a propeller P' to the rear thereof, the propeller having a hub member P" fairing the space between motor M' and the propeller to rearwardly carry out the low resistance form or streamline contour of fuselage 10'. A vertical fin 18d and directional control surface or rudder 19d, are mounted on the upper side of fuselage 10' spaced forward from motor M' and propeller P', while the horizontal stabilizer 32 and elevator 33 are mounted extending from opposite sides of the fuselage forward of motor M' and below the fin and rudder.

In the embodiment of Fig. 9, the supporting surface and all control surfaces are forward of propeller P' and removed from mutual effect or interference. Forward vision from the open cockpit 34 is unimpaired by motor or propeller, and for military purposes a forwardly mounted machine gun or guns 36, can be utilized without the necessity for synchronizing gear to permit firing through a propeller.

The invention, aside from the examples of land and water types of landing gear herein disclosed, specifically includes water landing and flotation gear of the flying boat or hull types, as well as amphibian types of gear.

Further, in the examples herein presented, of supporting surface or wing arrangements, both the multiplane and monoplane types are shown. The invention, however, in its broad aspect is not limited to any particular wing arrangements but includes any arrangement of multiple wings or of single wings, such for example, as the provision of the forward wing of Figs. 1 to 3, as a low wing type, with the rear wing of the high wing type, or the association of such wings into an arrangement to provide the conventional multiplane wing cellule. The use herein and in the appended claims, of the terms "supporting surface" or "wing", is in a broad, generic sense to include the total supporting surface or wing area, whether formed of a single surface or wing, or a multiplicity thereof.

In the preferred relative mounting and arrangement of the forward and rear wings 15 and 12, the front wing 15 is set at such an angle of incidence as to stall ahead of the rear wing 12, when the airplane assumes a given attitude, thus providing a non-stalling combination of wings 12 and 15 of the airplane. Such non-stalling condition can also be arrived at by either automatically or manually pivoting the front wing 15 about its forward spar, as hereinbefore referred to.

An effective retarding of the landing speed of an airplane embodying the design of Figs. 1 to 3, results from the weight distribution to the rear, with the rear landing wheels 20, provided with suitable shock absorbing mechanism (not shown), because as the airplane lands with the weight thrown onto these rear wheels, the shock absorbers compress and the rear end of the body lowers to thereby increase the angle of attack of wings 12 and 15. The increased angle of attack substantially increases the drag and materially slows up and retards forward velocity of the airplane in landing.

While in the example here shown, the motor or power plant is located at substantially the extreme rear or tail end portion of the body or fuselage, all features of the invention are not limited to such mounting, as a power plant or plants can be located forward of the positions here shown with the propeller shafting extended rearwardly from such forward position.

It is also evident that various other modifications, changes, variations, substitutions, additions, and eliminations might be resorted to without departing from the spirit and scope of my invention, and hence I do not desire to limit my invention in all respects to the exact and specific disclosures hereof.

What I claim, is:

1. In an airplane, a fuselage, a propeller mounted at the extreme tail end of the fuselage, a wing mounted on the fuselage forward of said propeller, said fuselage and wings removed from the rearwardly directed propeller slipstream, vertically disposed stabilizing fins mounted on and depending from the under side of said wing adjacent the wing tips, respectively, a vertical, laterally swingable rudder mounted on and extending rearwardly from each of said stabilizing fins, and a landing surface engaging member mounted at the lower end of each of said fins.

2. In an airplane, a fuselage, a propeller mounted at the extreme tail end of the fuselage, a supporting surface for the airplane mounted on the fuselage forward of said propeller, said fuselage and supporting surface removed from the rearwardly directed propeller slipstream, a landing gear for the airplane, including a vertical stabilizing fin depending from the fuselage, and a landing surface engaging member mounted at the lower end of said fin, and a vertical rudder pivotally mounted on said fin extending rearwardly therefrom for horizontal swinging thereon to directionally control the airplane, said fin and rudder positioned forward of said propeller and removed from any aerodynamic effect on its slipstream.

3. In an airplane, a fuselage, a wing mounted on the fuselage, vertically disposed stabilizing fins mounted on and depending from the under side of said wing at opposite sides of the fuselage, a vertical laterally swingable rudder mounted on and extending rearwardly from each of said stabilizing fins, and a landing surface engaging member on the lower end of each of said fins.

4. The combination in an airplane, of a wing, with a vertically disposed stabilizing fin mounted on and depending from the wing, a vertical, laterally swingable rudder mounted on said fin, and a landing surface engaging member on the lower end of said fin.

5. In an airplane, a fuselage, and a landing gear for the airplane, including a vertical stabilizing fin depending from the fuselage, a landing surface engaging member mounted at the lower end of said fin, and a vertical rudder pivotally mounted on said fin extending rearwardly therefrom for horizontal swinging to directionally control the airplane.

6. In an airplane, in combination, a low air resistance, substantially symmetrical streamline fuselage of gradually decreasing diameter rearwardly, a propeller mounted in position at the extreme rear end of said fuselage, a wing mounted on the rear end portion of the fuselage forwardly of said propeller, a wing mounted on the fuselage at the forward portion thereof spaced rearwardly from and unobstructing the streamline nose portion of the fuselage, said fuselage and wings removed from the effect of the rearwardly directed propeller slipstream, lateral and longitudinal control surfaces mounted forwardly of said propeller in position relative thereto as to substantially aerodynamically unaffect the propeller, a directional control surface mounted spaced forwardly from and substantially unaffecting the propeller, all of said control surfaces in position removed from the effects of the propeller slipstream thereon, a motor mounted at the tail end of the fuselage in the portion of minimum diameter in operative relation with said propeller, and the portions of the fuselage forward of said motor and of greatest fuselage diameters providing the useful load space for the airplane.

7. In an airplane, in combination, a low air resistance substantially symmetrical streamline fuselage, a propeller mounted in position at the extreme rear end of the fuselage with its axis of rotation substantially alined with the longitudinal axis of the fuselage and provided with a hub portion in rearward streamline continuation of and carrying out and defining the tail end contour of said fuselage, a wing mounted on the fuselage with its trailing edge located at the rear portion of the fuselage but spaced forwardly of the propeller whereby said wing and the fuselage are removed from the effect of the rearwardly directed propeller slipstream, lateral and longitudinal control surfaces mounted forwardly of said propeller in positions relative thereto such that their operation is without substantial effect on the airflow to the propeller, a directional control surface mounted forwardly of and in relative position to the propeller such that its operation is without substantial effect on the airflow to the propeller, and the said lateral, longitudinal and directional control surfaces being so positioned that they are removed from the effects of the rearwardly directed propeller slipstream thereon.

8. In an airplane, in combination, a low air resistance, streamline fuselage, a propeller mounted at the extreme tail end of the fuselage, a supporting surface of the low monoplane wing type mounted on the fuselage at the rear portion thereof with its trailing edge forwardly of the propeller, a supporting surface of the high monoplane wing type mounted on the fuselage at the forward portion thereof but spaced rearwardly from and uninterrupting the streamline nose portion of the fuselage, said rearwardly mounted supporting surface forming the major supporting surface of the airplane, said fuselage and supporting surfaces, in positions relative to the propeller removed from the rearwardly directed propeller slipstream, control surfaces mounted on the rear wing along the trailing portion thereof at opposite sides of the propeller in positions such that the propeller is unaffected by air disturbances created by operation of such control surfaces, and a directional control surface mounted in position relative to the propeller such that the propeller is unaffected by air disturbances created by operation of such surface.

9. In an airplane, in combination, a fuselage, a motor and a propeller mounted at the tail end portion of the fuselage, a supporting surface of the low monoplane wing type mounted on the fuselage at the rear end portion thereof, a supporting surface of the high monoplane wing type mounted on the forward portion of the fuselage, a landing gear for the airplane including, a vertically movable landing surface engaging member at the rear portion of the airplane, and a landing surface engaging member at the forward portion of the airplane, the rear landing member located relative to the weight of said motor and rear wing with respect to the weight of the forward portion of the fuselage and forward wing so that landing loads cause said rear landing member to move vertically and lower the rear portion of the fuselage to increase the angle of attack of the rearwardly mounted low monoplane type wing to increase the total drag thereof during the landing run.

10. In an airplane, in combination, a low air resistance, streamline fuselage, a propeller mounted at the extreme tail end of the fuselage, a supporting surface of the low monoplane wing type mounted on the fuselage at the rear portion thereof with its trailing edge forwardly of the propeller, a supporting surface of the high monoplane wing type mounted on the fuselage at the forward portion thereof but spaced rearwardly from and uninterrupting the streamline nose portion of the fuselage, control surfaces mounted on the rear supporting surface at opposite sides of the propeller in positions such that the propeller is unaffected by air disturbances created by operation of such control surfaces, and a directional control surface mounted on the fuselage at the forward wing in position forwardly of the propeller such that the airflow at the propeller is substantially unaffected by the operation of such directional control surface.

11. In an airplane, in combination, a low air resistance, streamline fuselage, a propeller mounted at the extreme tail end of the fuselage with its axis of rotation substantially alined with the longitudinal axis of the fuselage, a supporting surface of the low monoplane wing type mounted on the fuselage at the rear portion thereof with its trailing edge forwardly of the propeller a supporting surface of the high monoplane wing type mounted on the fuselage at the forward portion thereof but spaced rearwardly from and uninterrupting the streamline nose portion of the fuselage, said high monoplane type forward supporting surface providing for longitudinal control of the airplane and said rear low wing type supporting surface providing the major supporting surface of the airplane, and lateral control surfaces mounted on the rear wing at opposite sides of the propeller in positions such that the airflow to the propeller is substantially undisturbed by operation of such control surfaces.

12. In an airplane, in combination, a streamline fuselage, a propeller mounted at the extreme tail end of the fuselage, a supporting surface mounted on the fuselage at the rear lower portion thereof but with its trailing edge spaced forwardly of the propeller, a supporting surface mounted on the fuselage at the forward upper portion thereof and spaced forwardly from and in a plane above the plane of the rear supporting surface, said forward supporting surface spaced rearwardly from and uninterrupting the forward streamline nose portion of the fuselage, said rearward supporting surface providing the major supporting surface for the airplane and said forward supporting surface providing for longitudinal control, lateral control surfaces mounted on the rear supporting surface at opposite sides of the propeller in positions such that the airflow to the propeller is unaffected by operation of the lateral control surfaces, and a directional control surface mounted forwardly of said propeller in position relative thereto such that the propeller is substantially unaffected by air disturbances resulting from the directional control surface operation.

WILLIAM L. LEWIS.